(12) United States Patent
Guo et al.

(10) Patent No.: US 11,102,406 B2
(45) Date of Patent: Aug. 24, 2021

(54) DEVICE OF PANORAMIC MAP BASED ON AN EQUIRECTANGULAR PROJECTION AND METHOD THEREOF

(71) Applicant: NATIONAL CHIAO TUNG UNIVERSITY, Hsinchu (TW)

(72) Inventors: Jiun-In Guo, Hsinchu (TW); Po-Hung Lin, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 17/101,424

(22) Filed: Nov. 23, 2020

(65) Prior Publication Data
US 2021/0203843 A1    Jul. 1, 2021

(30) Foreign Application Priority Data
Dec. 25, 2019 (TW) ................................ 108147549

(51) Int. Cl.
*H04N 5/232* (2006.01)
(52) U.S. Cl.
CPC ..... *H04N 5/23238* (2013.01); *H04N 5/23299* (2018.08); *H04N 5/232125* (2018.08)
(58) Field of Classification Search
USPC ................................ 348/218.1; 382/294, 284
See application file for complete search history.

(56) References Cited

U.S. PATENT DOCUMENTS

2019/0096081 A1* 3/2019 Gupta ...................... G06T 7/70

FOREIGN PATENT DOCUMENTS

CN    109509230 A    3/2019

OTHER PUBLICATIONS

Taiwan Patent Office, Office Action, Patent Application Serial No. TW 108147549, dated Oct. 27, 2020.
Taiwan Patent Office, Search Report, Patent Application Serial No. TW 108147549, dated Oct. 27, 2020.

* cited by examiner

*Primary Examiner* — Xi Wang
(74) *Attorney, Agent, or Firm* — Rabin & Berdo, P.C.

(57) ABSTRACT

A method of processing a panoramic map based on an equirectangular projection is provided. The method comprises the following steps. A first and a second equirectangular projected panoramic images are captured through at least one lens at different time, respectively. The first and the second equirectangular projected panoramic images are perspectively transformed based on at least one horizontal angle, respectively. A plurality of first and second feature points are extracted from the first and the second equirectangular projected panoramic images, respectively. A plurality of identical feature points in the first and the second feature points are tracked. A camera pose is obtained based on the identical feature points. A plurality of 3D sparse point maps, in binary format, are established based on the at least one horizontal angle. The camera pose and the 3D sparse point maps are exported to an external system through an export channel.

20 Claims, 5 Drawing Sheets

DEVICE OF PANORAMIC MAP BASED ON AN EQUIRECTANGULAR PROJECTION AND METHOD THEREOF

FIELD OF TECHNOLOGY

The invention relates to a device and a method for processing a panoramic map, more particularly to a device and a method for processing a panoramic map based on an equirectangular projection.

BACKGROUND

In recent years, the development of simultaneous localization and mapping (SLAM) technology has gradually matured and gained more attention for camera is cheap and setting or calibration is relatively simple compared to other sensors. However, the problem to be solved is that the algorithm used by the SLAM technology is much more complicated and the needed calculation amount thereof is larger. In practical applications, the SLAM technology has been applied to unmanned vehicles, automated guided vehicle (AGV) storage, automatic wheelchairs, self-driving cars, planetary detection vehicles, sweeping robots, or inside human bodies.

The visual SLAM can be roughly divided into a direct method and a feature-based method according to pixel size that are used. The direct method will directly use the entire map image for localizing and evaluating the camera pose. For example, a large-scale direct SLAM (LSD-SLAM) algorithm is less time-consuming but more sensitive to brightness change. Further, the entire map image is processed by the LSD-SLAM algorithm, so the needed memory for storing maps is larger. The feature-based method first extracts feature points of the entire map image. Although the feature-based method is more time-consuming than the direct method, it is more noise resistant to ambient light for the input noise is less, and the needed memory for storing the maps is less since the entire map image shall not be used to be processed.

Regarding the input sensing data, the prior art can be divided into two types, that is, single lens and multiple lenses. The camera pose calculation (the ORB-SLAM2 algorithm, for example) of the single lens is relatively simple, but it is usually limited by the field of view (FOV) of the camera lens and results in difficulty to localizing when the camera lenses are blocked by other objects. For another example, when a single omnidirectional camera is used to shoot, the horizontal field of view can reach 360 degrees, but the vertical field of view is still limited. In the related literature of the multiple lenses, most of the methods are first defining the amount of camera lenses and the relative position of each camera lens, and images of each the camera lens are directly used for localization and map establishment without any projection or jointing. However, when manually overlapping the multiple images generated after the localization of the multiple camera lenses, it is quite likely to generate drift errors of the same feature points owing to the distortion or deformation of the images, and further affect the accuracy of localization.

Accordingly, how to design a device of processing a panoramic map based on an equirectangular projection and method thereof is an important issue, especially for solving the technical problems of the limitation of FOV, execution efficiency and accuracy of localization.

SUMMARY

Accordingly, a method of processing a panoramic map based on an equirectangular projected panoramic image is provided. This method solves the technical problem of the FOV limitation of a single lens, improves efficiency and accuracy of extracting the feature points, and further achieves the goal of conveniently using the localization and establishment of panoramic map with high stability.

Accordingly, a method of processing the panoramic map based on the equirectangular projection is provided. The method comprises the following steps.

A plurality of equirectangular projected panoramic images are captured through at least one lens, wherein the equirectangular projected panoramic images comprise a first equirectangular projected panoramic image and a second equirectangular projected panoramic image. The first equirectangular projected panoramic image and the second equirectangular projected panoramic image are respectively perspectively transformed based on at least one horizontal angle. A plurality of first feature points are extracted from the first equirectangular projected panoramic image and a plurality of second feature points are extracted from the second equirectangular projected panoramic image. A plurality of identical feature points are tracked in the first feature points based on the second feature points. A camera pose is obtained based on the identical feature points. A plurality of 3D sparse point maps are established based on the at least one horizontal angle, wherein the 3D sparse point maps are in binary format. The camera pose and the 3D sparse point maps are exported to an external system through an export channel.

According to another embodiment of the invention, the method further comprises the following steps after the 3D sparse point maps are established. A similarity of the 3D sparse point maps is compared and obtained. A drift error in the 3D sparse point maps is removed when the similarity is higher than a reference threshold to optimize and export the 3D sparse point maps.

According to still another embodiment of the invention, the 3D sparse point maps are relocated to re-track the equirectangular projected panoramic images when unable to successfully track the identical feature points.

According to still another embodiment of the invention, the method further comprises the following steps after the 3D sparse point maps are established. A current keyframe and an area map keyframe are separately inserted for the 3D sparse point maps. A plurality of identical keyframe feature points of the current keyframe are tracked based on the area map keyframe to update the 3D sparse point maps.

According to still another embodiment of the invention, the method further comprises the following step after capturing the equirectangular projected panoramic images. The equirectangular projected panoramic images are recorded to save the equirectangular projected panoramic images as a panoramic video file.

According to still another embodiment of the invention, the method further comprises the following steps after saving the equirectangular projected panoramic images. The panoramic video file is played. The equirectangular projected panoramic images of the panoramic video file are captured. The equirectangular projected panoramic images are perspectively transformed based on the at least one horizontal angle.

According to still another embodiment of the invention, the panoramic video file is repeatedly played in an order of forward and reverse until a playback number of repeated playbacks is identical to a preset playback number, so as to separately capture the equirectangular projected panoramic images and perspectively transform the equirectangular projected panoramic images based on the at least one corresponding horizontal angle.

According to still another embodiment of the invention, the at least one horizontal angle corresponding to each the playback number is non-repeated.

According to still another embodiment of the invention, a target capturing angle corresponding to the at least one lens is repeatedly adjusted until the equirectangular projected panoramic images are successfully captured when unable to successfully capture the equirectangular projected panoramic images.

According to still another embodiment of the invention, the method further comprises the following steps after successfully capturing the equirectangular projected panoramic images. The target capturing angle is adjusted to 0 degrees when the target capturing angle is 270-360 degrees or 0-90 degrees, and the target capturing angle is adjusted to 180 degrees when the target capturing angle is 90-270 degrees.

Moreover, a device of processing the panoramic map based on the equirectangular projection is further provided. This method solves the technical problem of the FOV limitation of a single lens, improves efficiency and accuracy of extracting the feature points, and further achieves the goal of conveniently using the localization and establishment of panoramic map with high stability.

The device of processing a panoramic map based on an equirectangular projection comprises an image capturing module, a simultaneous localization and mapping module, and a camera pose exporting module.

The image capturing module captures a plurality of equirectangular projected panoramic images through at least one lens, wherein the equirectangular projected panoramic images comprise a first equirectangular projected panoramic image and a second equirectangular projected panoramic image.

The simultaneous localization and mapping module is communicationally connected to the image capturing module, wherein the simultaneous localization and mapping module comprises a perspective transforming unit, a feature point extracting unit, a tracking unit, an area positioning unit, and an area map unit. The perspective transforming unit reads the first equirectangular projected panoramic image and the second equirectangular projected panoramic image to perspectively transform the first equirectangular projected panoramic image and the second equirectangular projected panoramic image based on at least one horizontal angle. The feature point extracting unit reads the first equirectangular projected panoramic image and the second equirectangular projected panoramic image to separately extract a plurality of first feature points from the first equirectangular projected panoramic image and a plurality of second feature points from the second equirectangular projected panoramic image. The tracking unit reads the first feature points and the second feature points to track a plurality of identical feature points in the first feature points based on the second feature points. The area positioning unit reads the identical feature points to calculate and export a camera pose based on the identical feature points. The area map unit reads the identical feature points and the camera pose to establish a plurality of 3D sparse point maps based on the at least one horizontal angle, wherein the 3D sparse point maps are in binary format.

The camera pose exporting module is communicationally connected to the simultaneous localization and mapping module and reading the camera pose and the 3D sparse point maps to export the camera pose and the 3D sparse point maps to an external system through an export channel.

According to another embodiment, the simultaneous localization and mapping module further comprises a loop detecting unit comparing a similarity of the 3D sparse point maps and removing a drift error in the 3D sparse point maps when the similarity is higher than a reference threshold to optimize and export the 3D sparse point maps.

According to still another embodiment, the area positioning unit relocates the 3D sparse point maps provided for the tracking unit to re-track the identical feature points when unable to successfully track the identical feature points.

According to still another embodiment, the simultaneous localization and mapping module further comprises a map point keyframe generating unit. The map point keyframe generating unit reads the 3D sparse point maps to separately insert a current keyframe and an area map keyframe for the 3D sparse point maps and track a plurality of identical keyframe feature points of the current keyframe based on the area map keyframe to update the 3D sparse point maps.

According to still another embodiment, the image capturing module further records the equirectangular projected panoramic images to save the equirectangular projected panoramic images as a panoramic video file.

According to still another embodiment, the perspective transforming unit reads the panoramic video file to play the panoramic video file, capture the equirectangular projected panoramic images of the panoramic video file, and perspectively transform the equirectangular projected panoramic images based on at least one horizontal angle.

According to still another embodiment, the perspective transforming unit repeatedly plays the panoramic video file in an order of forward and reverse until a playback number of repeated playbacks is identical to a preset playback number, so as to separately capture the equirectangular projected panoramic images and perspectively transform the equirectangular projected panoramic images based on the at least one corresponding horizontal angle.

According to still another embodiment, the at least one horizontal angle corresponding to each the playback number is non-repeated.

According to still another embodiment, the image capturing module repeatedly adjusts a target capturing angle corresponding to the at least one lens until the equirectangular projected panoramic images are successfully captured when unable to successfully capture the equirectangular projected panoramic images.

According to still another embodiment, the image capturing module adjusts the target capturing angle to 0 degrees when the target capturing angle is 270-360 degrees or 0-90 degrees and adjusts the target capturing angle to 180 degrees when the target capturing angle is 90-270 degrees after the equirectangular projected panoramic images are successfully captured.

To sum up, both the device and method of processing the panoramic map based on the equirectangular projected panoramic image solve the technical problem of the FOV limitation of a single lens and are not limited by the position of the camera lens (such as the camera lens may be blocked by objects). In addition, the three-dimensional sparse point map in binary format is used, which makes it faster and more efficient to be read, stored or updated. In practice, users may choose to optionally and permanently store the 3D sparse point maps updated by the loop detecting unit, or merely store the 3D sparse point maps available for the current use and not for the subsequent use. Therefore, the embodiments of the invention indeed improve efficiency and accuracy of extracting the feature points, and further achieve the goal of conveniently using the localization and establishment of panoramic map with high stability.

In order to further illustrate the technical features, means and effects, please refer to the following detailed description about the embodiments of the invention and the attached drawings to understand the embodiments of the invention deeper and more specific. However, the drawings in this specification are only used for reference and description, and are not intended to limit the scope of the embodiments of the invention.

DESCRIPTION OF THE EMBODIMENTS

The following is only a description of some specific embodiments of the invention. Person skilled in the art may easily understand else advantages and effects of the invention according to the content disclosed in this specification. The embodiments of the invention may also be implemented or applied to else embodiments. Moreover, when constructing the scope of the invention, one may interpret each detail in the description of the invention based on different viewpoints and applications, and any modification or change may be made if not departing from the spirit of the invention.

It should be noted that the structures, proportions, sizes, component numbers, etc. shown in the drawings and the description are only used to make the content disclosed in the description more easily to understand or read for those person skilled in the art, and not to limit the conditions of the embodiments of the invention.

Figure 1:
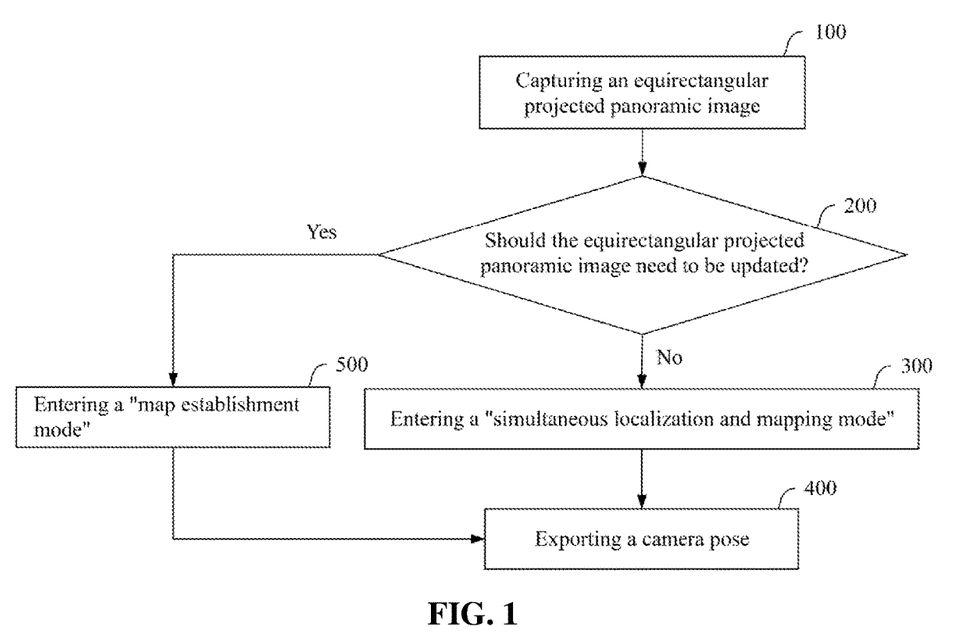
FIG. 1 is a flow chart of a method of processing a panoramic map based on an equirectangular projection according to an embodiment of the invention.

FIG. 1 is a flow chart of a method of processing a panoramic map based on an equirectangular projection according to an embodiment of the invention. In step 100 of FIG. 1, a plurality of equirectangular projected panoramic images are captured through at least one lens (for example, two circular fisheye lenses configured in back-to-back), wherein the equirectangular projected panoramic images comprises a first equirectangular projected panoramic image captured at a first time and a second equirectangular projected panoramic image captured at a second time later than the first time. In addition, no matter how many lenses are used (at least two are recommended to avoid the FOV limitation of single lens), as long as the combined panoramic image conforms to the equirectangular projection (ERP). Further, an equal distance of the equirectangular projection may be an equal projection focal length.

In step 200, the equirectangular projected panoramic images are determined whether to be updated or not according to preset conditions (for example, whether a relative coordinates of feature points of a map are changed, or whether the FOV of the camera lens is changed). When the equirectangular projected panoramic images do not need to be updated, a "simultaneous localization and mapping mode" of step 300 is entered; on the contrary, when the equirectangular projected panoramic images need to be updated, a "map establishment mode" of step 500 is entered.

The "simultaneous localization and mapping mode" of step 300 will first be described below.

Figure 2:
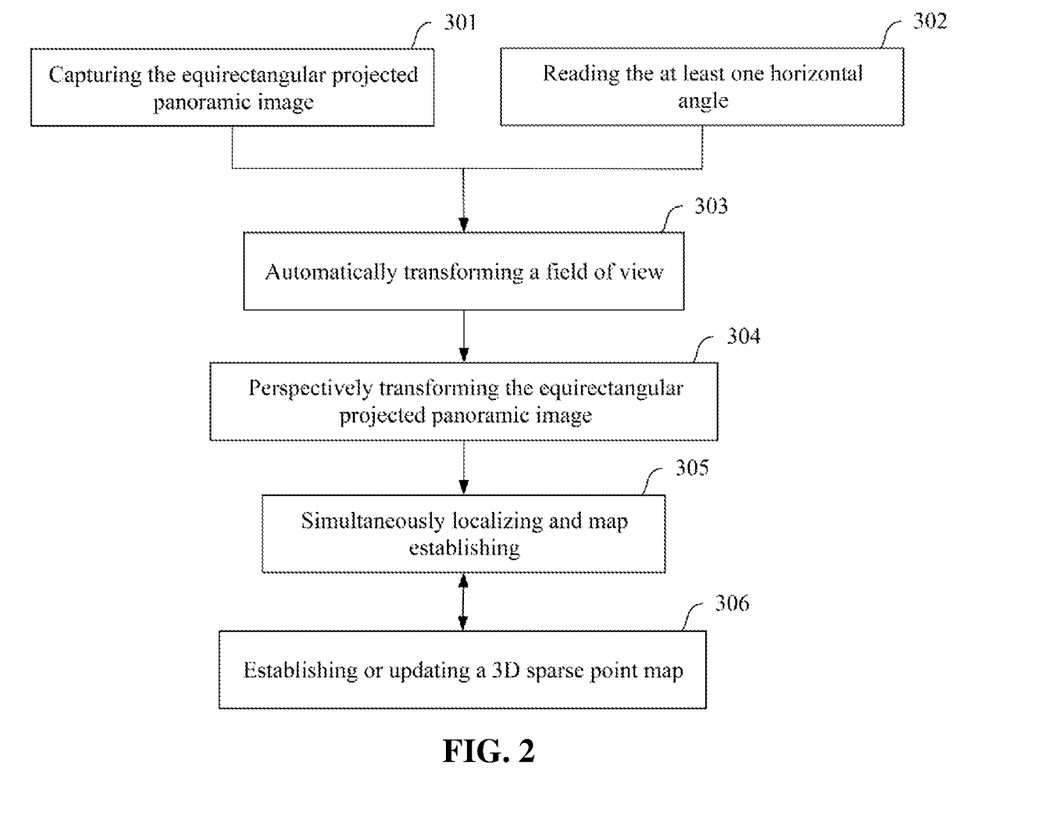
FIG. 2 is a flow chart of the "simultaneous localization and mapping mode" of the step 300 in the method of processing a panoramic map based on an equirectangular projection in FIG. 1 according to an embodiment of the invention.

When the equirectangular projected panoramic images do not need to be updated, enter the "simultaneous localization and mapping mode" of step 300. FIG. 2 is a flow chart of the "simultaneous localization and mapping mode" of the step 300 in the method of processing a panoramic map based on an equirectangular projection in FIG. 1 according to an embodiment of the invention. When the equirectangular projected panoramic images do not need to be updated, as in steps 301-302, the equirectangular projected panoramic images and at least one horizontal angle are captured and read.

In step 303, if there are, for example, the following conditions, the field of view (FOV) of the equirectangular projected panoramic images are automatically transformed.

For example, a target capturing angle (defined by a user) corresponding to the at least one lens is repeatedly adjusted to adjust the FOV of the area to be positioned until the equirectangular projected panoramic images are successfully captured when unable to successfully capture the equirectangular projected panoramic images.

In another example, after successfully capturing the equirectangular projected panoramic images, the target capturing angle is adjusted to 0 degrees when the target capturing angle is 270-360 degrees or 0-90 degrees; and the target capturing angle is adjusted to 180 degrees when the target capturing angle is 90-270 degrees.

In step 304, the first equirectangular projected panoramic image and the second equirectangular projected panoramic image are perspectively transforming based on at least one horizontal angle, respectively.

In step 305, simultaneous localization and map establishment are conducted and further comprise the following steps.

First, a plurality of first feature points are extracted from the first equirectangular projected panoramic image and a plurality of second feature points are extracted from the second equirectangular projected panoramic image. Subsequently, a plurality of identical feature points in the first feature points and the second feature points are tracked according to the second feature points. A camera pose may be obtained based on the identical feature points. The camera pose comprises location information of the camera according to the identical feature points in the maps of spherical or cylindrical coordinates. The camera pose may optionally be denoted by Eular angles on the xyz coordinate system. When unable to successfully track the identical feature points, for example, the equirectangular projected panoramic images are relocated to re-track the identical feature points.

In step 306, a plurality of 3D sparse point maps are established based on the at least one horizontal angle, the identical feature points and the camera pose, wherein the 3D sparse point maps are in binary format.

Moreover, the following steps may be further comprised after the 3D sparse point maps are established, for example.

First, a similarity of the 3D sparse point maps is compared. Subsequently, a drift error in the 3D sparse point maps is removed when the similarity is higher than a reference threshold to optimize and export the 3D sparse point maps. The reference threshold may, for example, be the amount of the identical feature points.

Even, the following steps may be further comprised before comparing the similarity of the 3D sparse point maps, for example.

First, a current keyframe and an area map keyframe for the 3D sparse point maps are separately inserted. Subsequently, as in step 306, a plurality of identical keyframe feature points of the current keyframe are tracked based on the area map keyframe to update the 3D sparse point maps, in binary format.

Figure 3A:
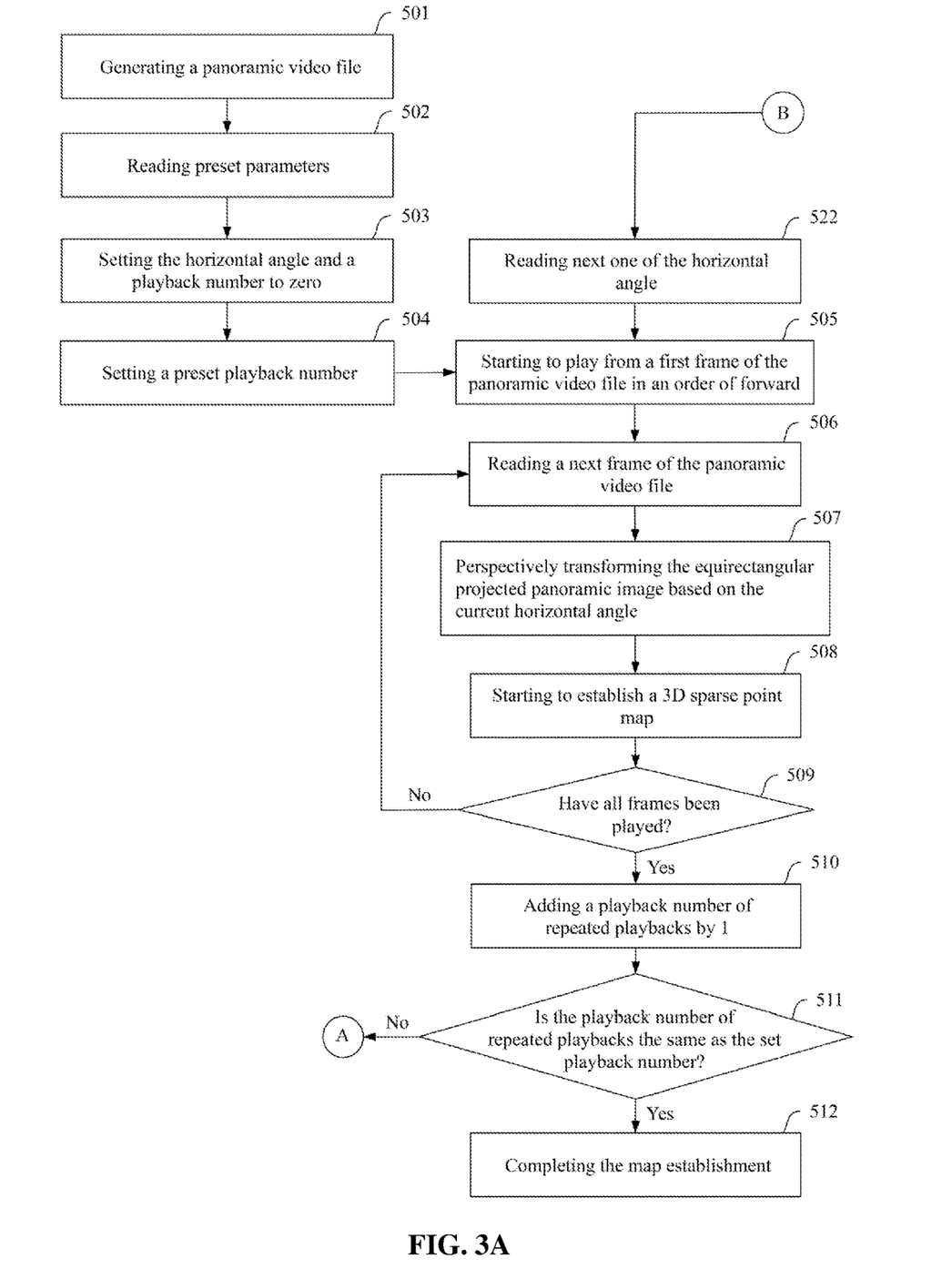
FIGS. 3A-3B are flow charts of the "map establishment mode" of the step 500 in the method of processing a panoramic map based on an equirectangular projection in FIG. 1 according to an embodiment of the invention.
Figure 3B:
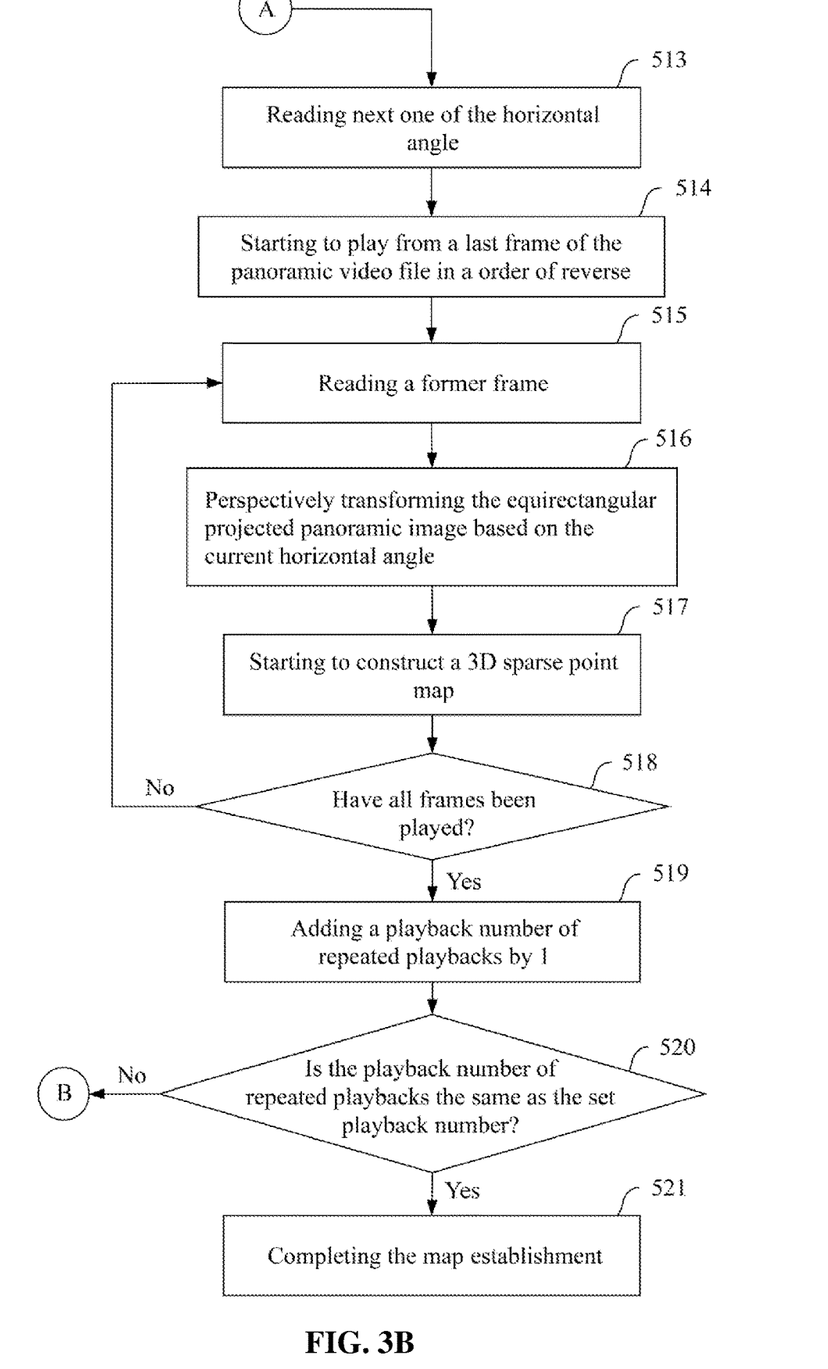

The "map establishment mode" of step 500 will be further described below.

When the equirectangular projected panoramic images need to be updated, enter the "map establishment mode" of step 500. FIGS. 3A-3B are flow charts of the "map establishment mode" of the step 500 in the method of processing a panoramic map based on an equirectangular projection in FIG. 1 according to an embodiment of the invention. In step 501, the equirectangular projected panoramic images are recorded to generate and then save the equirectangular projected panoramic images as a panoramic video file. In step 502, a preset parameter is read. The preset parameter may be the width and height pixel value, elevation angle or depression angle (for example, the angle is preset as 0 degrees). Moreover, when the internal preset parameters (such as Fx, Fy, Cx, and Cy) of the perspective camera are all equal to −1, the automatically calculated values may be used, of course, the values may also be set manually. In step 503, the at least one horizontal angle and a playback number of the panoramic video file are all set as 0. In step 504, a preset playback number of the panoramic video file is set.

Next, the following steps may be further comprised after generating and saving the equirectangular projected panoramic images. First, the panoramic video file is played. Next, the equirectangular projected panoramic images of the panoramic video file are captured. Next, the equirectangular projected panoramic images are perspectively transformed based on the at least one horizontal angle, wherein the at least one horizontal angle corresponding to each the playback number is non-repeated, for example.

For example, the panoramic video file may be repeatedly played in an order of forward and reverse until a playback number of repeated playbacks are the same as the preset playback number, so as to separately capture the equirectangular projected panoramic images and perspectively transform the equirectangular projected panoramic images based on the at least one corresponding horizontal angle.

Next, for example, in step 505, the panoramic video file may be played from a first frame in an order of forward. Then, in step 506, a next frame is read. In step 507, the current equirectangular projected panoramic images are perceptively transformed according to the at least one current horizontal angle. Then, in step 508, the 3D sparse point maps are getting started to be established.

Then, in step 509, whether all frames have been played is determined. Steps 506-509 are repeated until that all frames have been played is determined. On the contrary, if that all of the frames are determined to be completely played, as in step 510, the record of the playback number recorder may be added by 1, for example; that is, the playback number of repeated playbacks is added by 1.

Later, in step 511, whether the playback number of repeated playbacks is the same as the preset playback number is determined. If the same, as in step 512, the map establishment is completed and the flow of "map establishment mode" is finished. Otherwise, if not the same, as in step 513, a next at least one horizontal angle is continued to be read, wherein the at least one horizontal angle is not repeated.

As above mentioned, if the playback number of repeated playbacks is not the same as the preset playback number, as in step 513, next one of the at least one horizontal angle is continued to be read. Then, in step 514, the panoramic video file is played from the last frame in an order of reverse, similar to the steps 506-511. In step 515, a former frame is read. Then, in step 516, the current equirectangular projected panoramic images are perceptively transformed according to the at least one current horizontal angle. Then, in step 517, the 3D sparse point maps are getting started to be established.

Next, in step 518, whether all frames have been played is determined. Steps 515-518 are repeated until that all frames have been played is determined. On the contrary, if that all frames have been played is determined, as in step 519, the record of the playback number counter may be added by 1, for example; that is, the playback number of repeated playbacks is added by 1.

Later, in step 520, whether the playback number of repeated playbacks is the same as the preset playback number is determined. If the same, as in step 521, the map establishment is completed and the flow of "map establishment mode" is finished. Otherwise, if not the same, as in step 522, next one of the at least one horizontal angle is continued to be read, wherein the at least one horizontal angle is not repeated.

Finally, in step 400, the camera pose is obtained, and the camera pose and the 3D sparse point maps are exported through an export channel to an external system. In addition, the camera pose is capable of being provided to a transformation matrix (or called mapping matrix) in a 3D space to beread by other systems or used for recording the inertial motion trajectories, etc. The export channel may be VGA, DVI, HDMI or DP (display port) compatible communication protocols. Accordingly, the camera pose may be exported to the external system, or an imaged camera pose may be transported to a display device.

Besides, a device for processing a panoramic map based on an equirectangular projection is further provided.

Figure 4:
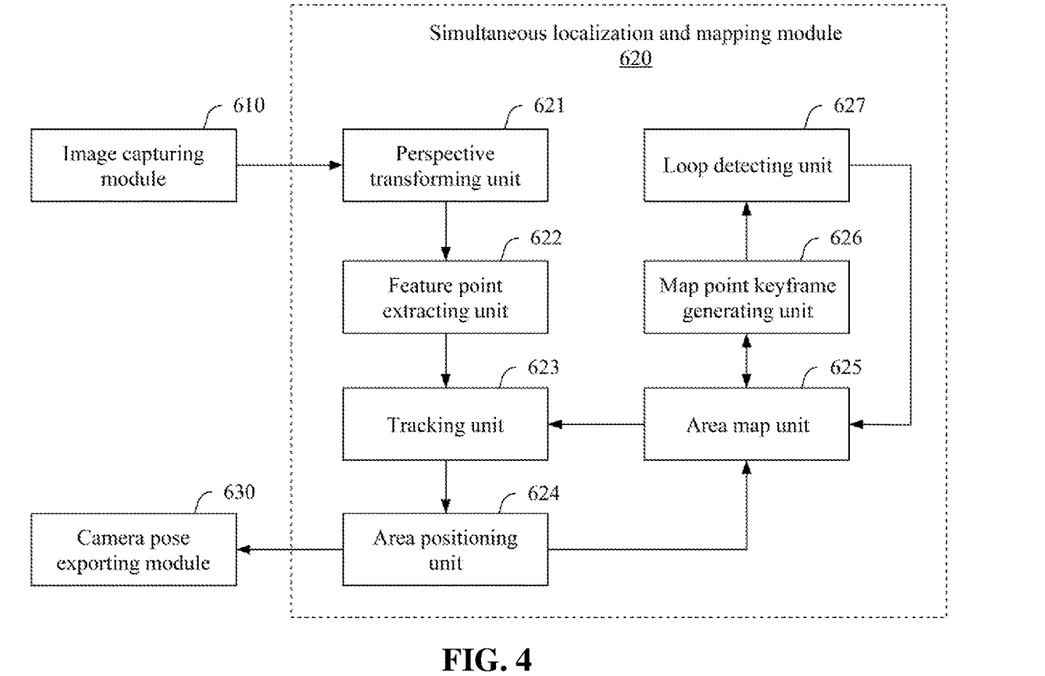
FIG. 4 is an illustrative diagram of a device of processing a panoramic map based on an equirectangular projection according to an embodiment of the invention.

FIG. 4 is an illustrative diagram of a device of processing a panoramic map based on an equirectangular projection according to an embodiment of the invention. The device 600 of processing a panoramic map based on an equirectangular projection comprises an image capturing module 610, a simultaneous localization and mapping module 620, and a camera pose exporting module 630. The device 600 of processing a panoramic map based on an equirectangular projection may be used to incorporate and function with an embedded platform and other movable device (such as vehicles, smartphones or wearable devices).

The image capturing module 610 is further described as follows.

The image capturing module 610 is used to capture a plurality of equirectangular projected panoramic images through at least one lens. The equirectangular projected panoramic images comprise a series of equirectangular projected panoramic images captured at different time, such as a first equirectangular projected panoramic image captured at a first time and a second equirectangular projected panoramic image captured at a second time later than the first time. The image capturing module 610 may be an electronic device such as a web camera, a digital camera, a smart phone, a driving recorder, or any combinations thereof. The details are as described above and will not be repeated here.

Further, the image capturing module 610 repeatedly adjusts a target capturing angle corresponding to the at least one lens until the equirectangular projected panoramic images are successfully captured when unable to successfully capture the equirectangular projected panoramic images, for example.

Furthermore, the image capturing module 610 adjusts the target capturing angle to 0 degrees when the target capturing angle is 270-360 degrees or 0-90 degrees and adjusts the target capturing angle to 180 degrees when the target capturing angle is 90-270 degrees after the equirectangular projected panoramic images are successfully captured, for example.

The simultaneous localization and mapping module 620 is further described as follows.

The simultaneous localization and mapping module 620 is communicationally connected to the image capturing module 610, wherein the simultaneous localization and mapping module 620 comprises a perspective transforming unit 621, a feature point extracting unit 622, a tracking unit 623, an area positioning unit 625, and an area map unit 624.

For example, the simultaneous localization and mapping module 620 may be adjusted based on ORB-SLAM or ORB-SLAM2 with an embedded system (such as Ubuntu). The ORB (oriented FAST and rotated brief) uses FAST (features from accelerated segment test) algorithm to detect a 3D sparse point map.

The simultaneous localization and mapping module 620 determines whether the equirectangular projected panoramic images should be updated or not according to preset conditions (for example, whether a relative coordinates of feature points of a map are changed, or whether the FOV of the camera lens is changed). When the equirectangular projected panoramic images do not need to be updated, a "simultaneous localization and mapping mode" is entered; on the contrary, when the equirectangular projected panoramic images need to be updated, a "map establishment mode" is entered.

The perspective transforming unit 621 is used to read the first equirectangular projected panoramic image and the second equirectangular projected panoramic image to perspectively transform the first equirectangular projected panoramic image and the second equirectangular projected panoramic image based on at least one horizontal angle, respectively. For example, a transformation between spherical coordinates and plane coordinates may be used when the equirectangular projected panoramic images are perspectively transformed. The details are as described above and will not be repeated here.

The feature point extracting unit 622 is used to read the first equirectangular projected panoramic image and the second equirectangular projected panoramic image to extract a plurality of first feature points from the first equirectangular projected panoramic image and extract a plurality of second feature points from the second equirectangular projected panoramic image. The first feature points and the second feature points may be further used for subsequent map establishment or localization. In addition, the extraction speed of the first feature points and the second feature points may be expedited by a GPU. The details are as described above and will not be repeated here.

The tracking unit 623 is used to read the first feature points and the second feature points to track a plurality of identical feature points in the first feature points and the second feature points. The details are as described above and will not be repeated here.

The area positioning unit 624 is used to read the identical feature points to calculate and export a camera pose based on the identical feature points. The details are as described above and will not be repeated here.

The area map unit 625 is used to read the identical feature points and the camera pose to establish a plurality of 3D sparse point maps based on the at least one horizontal angle, in binary format. The details are as described above and will not be repeated here.

Further, the area positioning unit 624 may be used to relocate the 3D sparse point maps provided for the tracking unit 623 to re-track the identical feature points when the tracking unit 623 is unable to successfully track the identical feature points, for example. The details are as described above and will not be repeated here.

For example, the simultaneous localization and mapping module 620 may further comprise a loop detecting unit 626. The loop detecting unit 626 is used to compare a similarity of the 3D sparse point maps and remove a drift error in the 3D sparse point maps when the similarity is higher than a reference threshold to optimize and export the 3D sparse point maps. The details are as described above and will not be repeated here.

For another example, the simultaneous localization and mapping module 620 may further comprise a map point keyframe generating unit 627. The map point keyframe generating unit 627 is used to read the 3D sparse point maps to separately insert a current keyframe and an area map keyframe for the 3D sparse point maps and track a plurality of identical keyframe feature points of the current keyframe based on the area map keyframe to update the 3D sparse point maps. The details are as described above and will not be repeated here.

According to another embodiment of the invention, the image capturing module 610 is further used to record the equirectangular projected panoramic images to save the equirectangular projected panoramic images as a panoramic video file. The details are as described above and will not be repeated here.

According to still another embodiment of the invention, the perspective transforming unit 621 is used to read the panoramic video file to play the panoramic video file, capture the equirectangular projected panoramic images of the panoramic video file, and perspectively transform the equirectangular projected panoramic images based on at least one horizontal angle, wherein the at least one horizontal angle is not repeated. The details are as described above and will not be repeated here.

According to still another embodiment of the invention, the perspective transforming unit 621 is used to repeatedly play the panoramic video file in an order of forward and reverse until a playback number of repeated playbacks is the same as the preset playback number, so as to separately capture the equirectangular projected panoramic images and perspectively transform the equirectangular projected panoramic images based on the at least one corresponding horizontal angle, wherein the at least one horizontal angle is not repeated. The details are as described above and will not be repeated here.

The camera pose exporting module 630 is further described as follows.

The camera pose exporting module 630 is used to be communicationally connected to the simultaneous localization and mapping module 620 and read the camera pose and the 3D sparse point maps to export the camera pose and the 3D sparse point maps to an external system through an export channel. The details are as described above and will not be repeated here.

A device and method thereof for a panoramic map based on an equirectangular projection according to the embodiments of the invention solve the technical problem of the FOV limitation of a single lens, and are not limited by the position of the camera lens (such as the camera lens may be blocked by objects). In particular, the panoramic maps based on the equirectangular projection are able to save more time when establishing maps and perceptively transforming with any horizontal angle. It not only reduces the range and amount of the feature points on the maps to accelerate the extraction speed of the feature points, but also maintains the quality and characteristics of panoramic vision. In addition, using 3D sparse point maps in binary format may be faster and more efficient to be read, stored, or updated. In practice, users may choose to optionally and permanently store the 3D sparse point maps updated by a loop detecting unit, or merely store the 3D sparse point maps available for the current use and not for the subsequent use. Therefore, the embodiments of the invention indeed improve efficiency and accuracy of extracting the feature points, and further achieve the goal of conveniently using the localization and establishment of panoramic map with high stability.

The above description is only the detailed description and the drawings of some of the embodiments of the invention. However, features of the invention are not limited thereto and should not be used to limit the scope of the invention. All the scope of the invention shall be subject to the following claims. Any embodiment that is within the spirit of the patent application scope of the invention or similar variations should be included in the scope of the invention. Any changes or modifications that can be easily considered by person skilled in the art of the invention may all be included in the patent scope of the invention.

What is claimed is:

1. A method of processing a plurality of equirectangular projected panoramic images, comprising the following steps:
    capturing a plurality of equirectangular projected panoramic images through at least one lens, wherein the equirectangular projected panoramic images comprising a first equirectangular projected panoramic image captured at a first time and a second equirectangular projected panoramic image captured at a second time later than the first time;
    perspectively transforming the first and the second equirectangular projected panoramic images based on at least one horizontal angle, respectively;
    separately extracting a plurality of first feature points from the first equirectangular projected panoramic image and a plurality of second feature points from the second equirectangular projected panoramic image;
    tracking a plurality of identical feature points in the first feature points and the second feature points;
    obtaining a camera pose based on the identical feature points;
    establishing a plurality of 3D sparse point maps based on the at least one horizontal angle, wherein the 3D sparse point maps are in binary format; and
    exporting the camera pose and the 3D sparse point maps to an external system through an export channel.

2. The method of claim 1, further comprising the following steps after the 3D sparse point maps are established:
    comparing a similarity of the 3D sparse point maps; and
    removing a drift error in the 3D sparse point maps when the similarity is higher than a reference threshold to optimize and export the 3D sparse point maps.

3. The method of claim 1, wherein the 3D sparse point maps are relocated to re-track the equirectangular projected panoramic images when unable to successfully track the identical feature points.

4. The method of claim 1, further comprising the following steps after the 3D sparse point maps are established:
    separately inserting a current keyframe and an area map keyframe for the 3D sparse point maps; and
    tracking a plurality of identical keyframe feature points of the current keyframe based on the area map keyframe to update the 3D sparse point maps.

5. The method of claim 1, further comprising the following step after capturing the equirectangular projected panoramic images:
    recording the equirectangular projected panoramic images to save the equirectangular projected panoramic images as a panoramic video file.

6. The method of claim 5, further comprising the following steps after saving the equirectangular projected panoramic images:
    playing the panoramic video file;
    capturing the equirectangular projected panoramic images of the panoramic video file; and
    perspectively transforming the equirectangular projected panoramic images based on the at least one horizontal angle.

7. The method of claim 6, wherein the panoramic video file is repeatedly played in an order of forward and reverse until a playback number of repeated playbacks is identical to a preset playback number, so as to separately capture the equirectangular projected panoramic images and perspectively transform the equirectangular projected panoramic images based on the at least one corresponding horizontal angle.

8. The method of claim 7, wherein the at least one horizontal angle corresponding to each the playback number is non-repeated.

9. The method of claim 1, wherein a target capturing angle corresponding to the at least one lens is repeatedly adjusted until the equirectangular projected panoramic images are successfully captured when unable to successfully capture the equirectangular projected panoramic images.

10. The method of claim 9, further comprising the following steps after successfully capturing the equirectangular projected panoramic images:
    adjusting the target capturing angle to 0 degrees when the target capturing angle is 270 to 360 degrees or 0 to 90 degrees; and
    adjusting the target capturing angle to 180 degrees when the target capturing angle is 90 to 270 degrees.

11. A device of processing a panoramic map based on an equirectangular projection comprising:
    an image capturing module capturing a plurality of equirectangular projected panoramic images through at least one lens, wherein the equirectangular projected panoramic images comprise a first equirectangular projected panoramic image captured at a first time and a second equirectangular projected panoramic image captured at a second time later than the first time;
    a simultaneous localization and mapping module communicationally connected to the image capturing module, wherein the simultaneous localization and mapping module comprises:

a perspective transforming unit reading the first equirectangular projected panoramic image and the second equirectangular projected panoramic image to perspectively transform the first and the second equirectangular projected panoramic image based on at least one horizontal angle, respectively;

a feature point extracting unit reading the first equirectangular projected panoramic image and the second equirectangular projected panoramic image to extract a plurality of first feature points from the first equirectangular projected panoramic image and extract a plurality of second feature points from the second equirectangular projected panoramic image;

a tracking unit reading the first feature points and the second feature points to track a plurality of identical feature points in the first feature points and the second feature points;

an area positioning unit reading the identical feature points to calculate and export a camera pose based on the identical feature points; and an area map unit reading the identical feature points and the camera pose to establish a plurality of 3D sparse point maps based on the at least one horizontal angle, wherein the 3D sparse point maps are in binary format; and a camera pose exporting module communicationally connected to the simultaneous localization and mapping module and reading the camera pose and the 3D sparse point maps to export the camera pose and the 3D sparse point maps to an external system through an export channel.

12. The device of claim 11, wherein the simultaneous localization and mapping module further comprises:

a loop detecting unit comparing a similarity of the 3D sparse point maps and removing a drift error in the 3D sparse point maps when the similarity is higher than a reference threshold to optimize and export the 3D sparse point maps.

13. The device of claim 11, wherein the area positioning unit relocates the 3D sparse point maps provided for the tracking unit to re-track the identical feature points when unable to successfully track the identical feature points.

14. The device of claim 11, wherein the simultaneous localization and mapping module further comprises:

a map point keyframe generating unit reading the 3D sparse point maps to separately insert a current keyframe and an area map keyframe for the 3D sparse point maps and track a plurality of identical keyframe feature points of the current keyframe based on the area map keyframe to update the 3D sparse point maps.

15. The device of claim 11, wherein the image capturing module further records the equirectangular projected panoramic images to save the equirectangular projected panoramic images as a panoramic video file.

16. The device of claim 15, wherein the perspective transforming unit reads the panoramic video file to play the panoramic video file, capture the equirectangular projected panoramic images of the panoramic video file, and perspectively transform the equirectangular projected panoramic images based on at least one horizontal angle.

17. The device of claim 16, wherein the perspective transforming unit repeatedly plays the panoramic video file in an order of forward and reverse until a playback number of repeated playbacks is identical to a preset playback number, so as to separately capture the equirectangular projected panoramic images and perspectively transform the equirectangular projected panoramic images based on the at least one corresponding horizontal angle.

18. The device of claim 17, wherein the at least one horizontal angle corresponding to each the playback number is non-repeated.

19. The device of claim 11, wherein the image capturing module repeatedly adjusts a target capturing angle corresponding to the at least one lens until the equirectangular projected panoramic images are successfully captured when unable to successfully capture the equirectangular projected panoramic images.

20. The device of claim 19, wherein the image capturing module adjusts the target capturing angle to 0 degrees when the target capturing angle is 270 to 360 degrees or 0 to 90 degrees and adjusts the target capturing angle to 180 degrees when the target capturing angle is 90 to 270 degrees after the equirectangular projected panoramic images are successfully captured.

* * * * *